July 26, 1938.     R. T. CORNELIUS     2,125,102
BEER DISPENSING DEVICE
Filed June 19, 1937      3 Sheets-Sheet 3
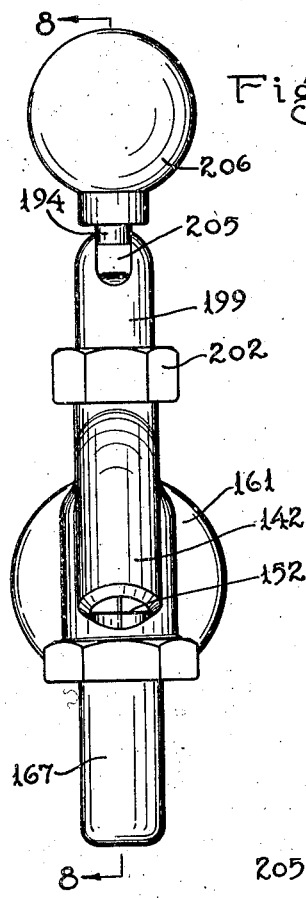
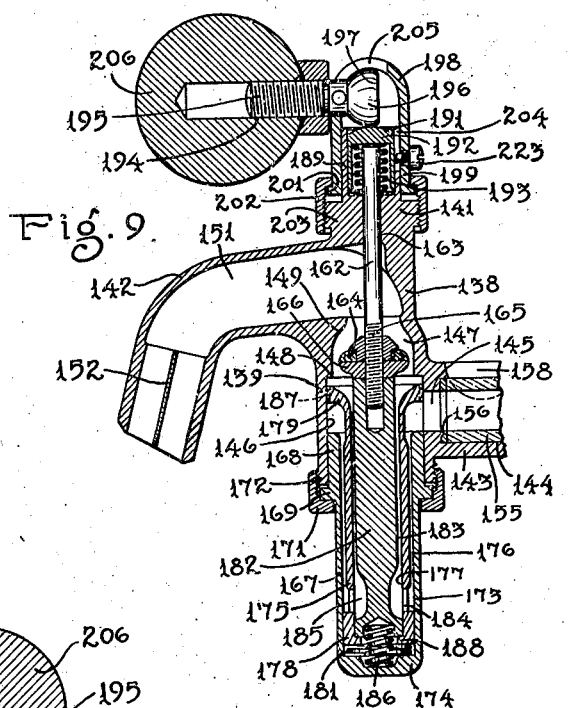
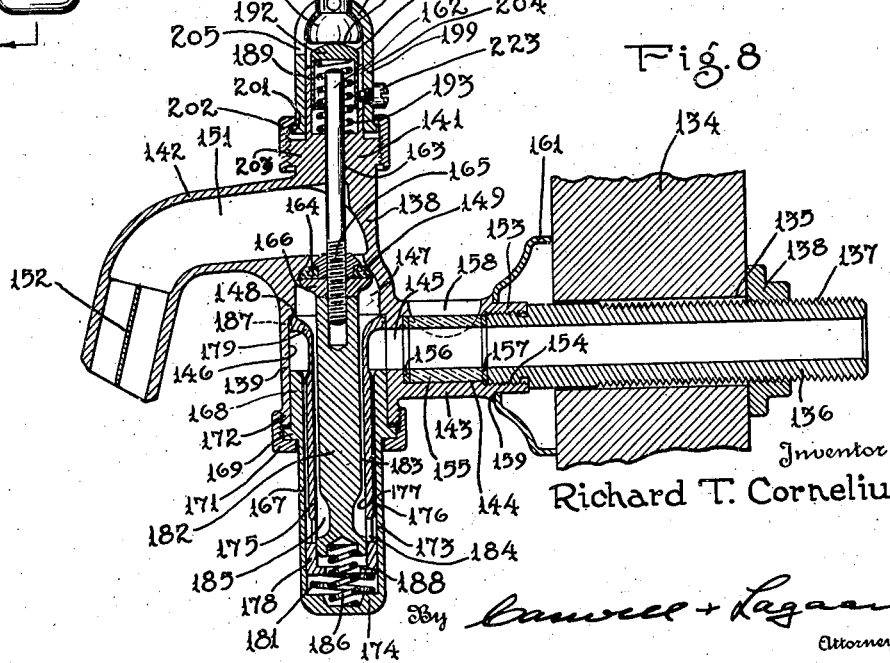
Inventor
Richard T. Cornelius Patented July 26, 1938

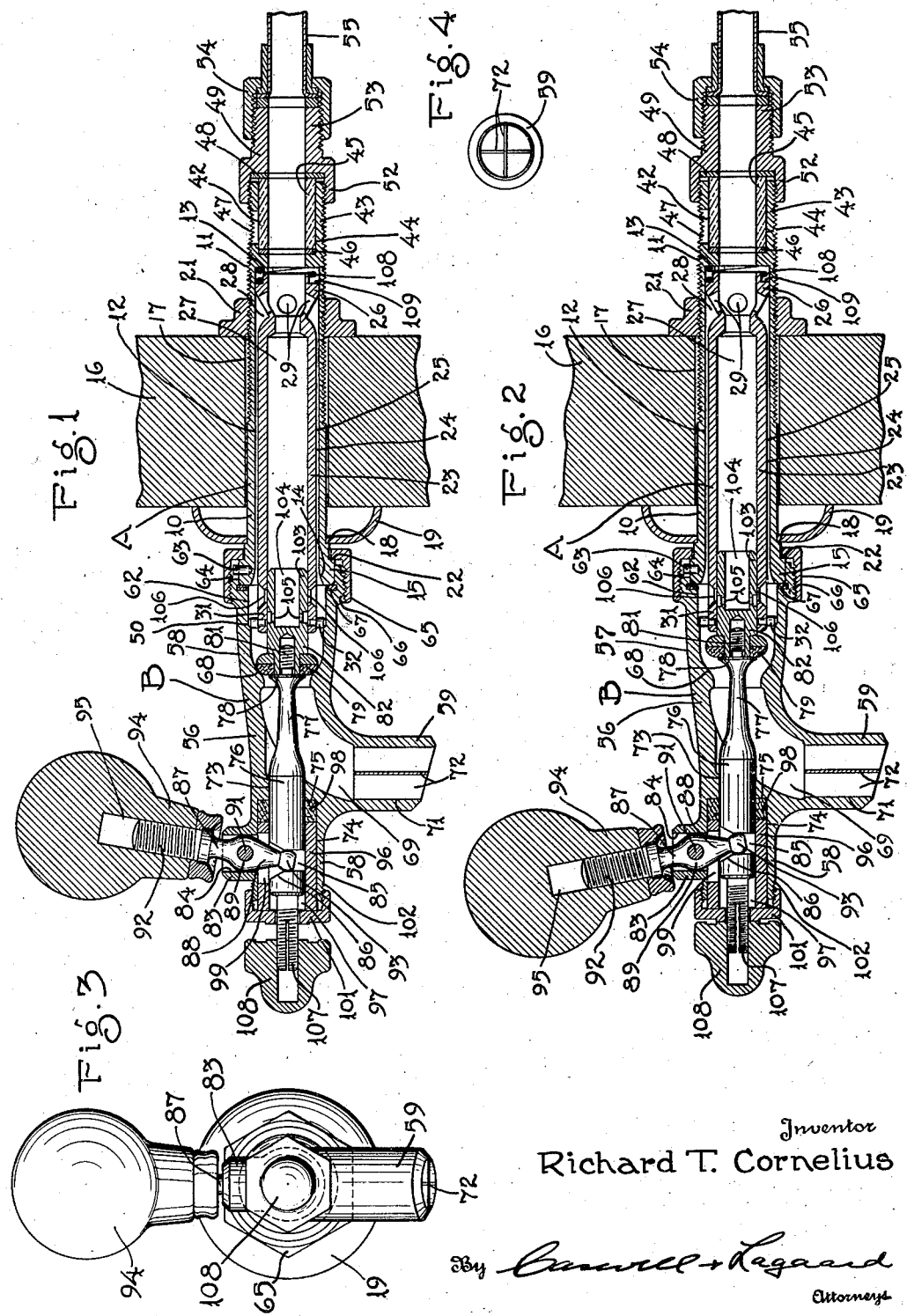

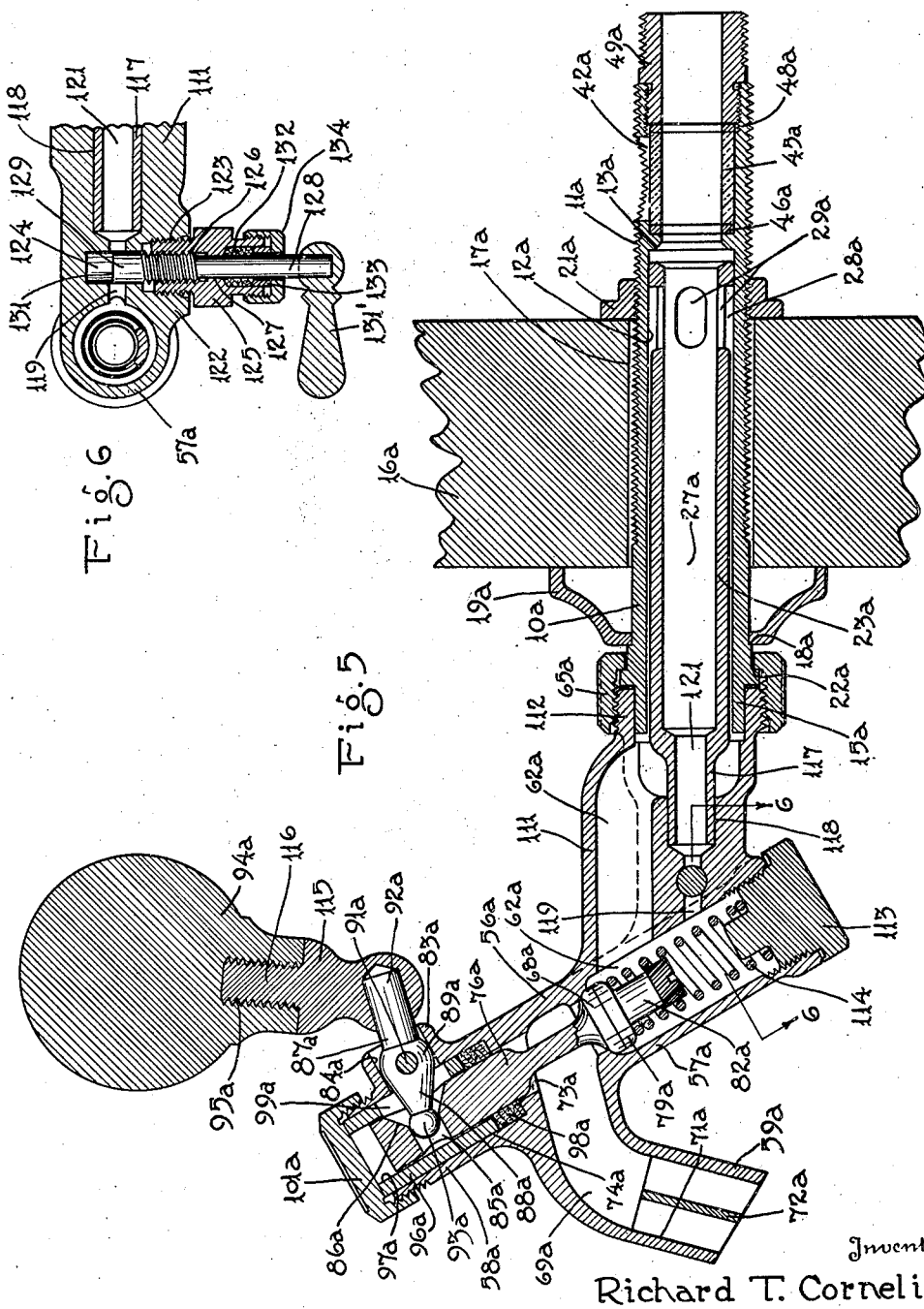

2,125,102

UNITED STATES PATENT OFFICE 2,125,102

BEER DISPENSING DEVICE

Richard T. Cornelius, Minneapolis, Minn.

Application June 19, 1937, Serial No. 149,102

18 Claims. (Cl. 225—6)

My invention relates to beer dispensing devices and has for an object to provide a device by means of which beer with any amount of foam or collar may be drawn.

Another object of the invention resides in providing a device by means of which a creamy foam or a foam with fine bubbles may be formed on the drawn beer.

An object of the invention resides in providing a device in which the amount of foam produced is controlled independently of the manner in which the beer is directed into the drinking vessel.

A still further object of the invention resides in providing a device in which part of the beer is drawn through a passageway reducing the pressure of the beer without agitation and another part of the beer is drawn through a by-pass with considerable agitation and united with the first drawn beer prior to delivery into the drinking vessel.

Other objects of the invention reside in the novel combination and arrangement of parts and in the details of construction hereinafter illustrated and/or described.

In the drawings:

Fig. 1 is an elevational sectional view of a beer dispensing device illustrating an embodiment of my invention.

Fig. 2 is a view similar to Fig. 1 showing the parts in altered position.

Fig. 3 is an end elevational view of the structure shown in Fig. 1.

Fig. 4 is an inverted view of the faucet spout.

Fig. 5 is a view similar to Fig. 1 of a modification of the invention.

Fig. 6 is a sectional detail view taken on line 6—6 of Fig. 5.

Fig. 7 is a front elevational view of another form of the invention.

Fig. 8 is a longitudinal elevational sectional view taken on line 8—8 of Fig. 7.

Fig. 9 is a view similar to Fig. 8 showing the parts in altered relation.

In the dispensing of beer it becomes desirable to serve the beer with a certain amount of foam and particularly with a foam consisting of minute bubbles which gives the foam a creamy appearance. A very customary practice has been to draw clear beer if possible and to procure agitation of the beer and foaming by allowing the beer to strike the drinking vessel in a particular manner. This results in large bubbles and makes it impossible to control the amount of foam or collar produced. The present invention overcomes these difficulties by providing a dispensing device by means of which any amount of foam may be procured on the beer and a foam having relatively fine bubbles.

My invention consists of two parts, a flow regulating device which I have indicated in its entirety by the reference numeral A and a faucet indicated in its entirety by the reference numeral B. The particular form and construction and the arrangement of the various elements of these parts will now be described in detail.

The flow regulating device A consists of a tubular member 10 threaded at one end upon its exterior as indicated at 11. This tubular member is formed with a cylindrical bore 12 extending throughout substantially the entire length thereof, which bore is provided at one end with an inwardly extending shoulder 13. The extreme end of this tubular member is flared as indicated at 14 and a portion of said tubular member at such end is constructed with an outwardly extending flange 15 providing a shoulder 22 between said flange and the body of the tubular member.

For the purpose of illustrating the application of the invention a portion of a beer cabinet which represents one of the vertical walls thereof has been shown in the drawings and designated by the reference numeral 16. This wall has a cylindrical horizontal hole 17 through which the tubular member 10 of the dispensing device extends. This tubular member is mounted on the wall 16 as follows: Near the outer end of said tubular member is formed a shoulder 18. A collar 19 encircles the tubular member 10 and is seated against the shoulder 18 and also against the front surface of the wall 16 of the beer cabinet. A nut 21 threaded upon the threads 11 of the tubular member 10 seats against the inner surface of the wall 16 of said beer cabinet and holds the tubular member 10 in position.

Within the tubular member 10 is mounted a core 23 which is constructed with a cylindrical surface 24 of slightly lesser diameter than the diameter of the bore 12 to provide a constricted passageway 25 between the tubular member 10 and the core 23. At one end of the core 23 is provided a flange 26 of substantially the same diameter as the bore 12 which forms a guide for one end of the core, whereby the core may be moved longitudinally within the bore 12 for a purpose to be presently described in detail. The other end of the core 23 is guided in a manner to be presently described in detail. In the core 23 and extending longitudinally throughout the length of the same is a bore 27 which passes through the flange 26. Adjacent the flange 26 the core 23 is constructed with an annular groove or recess 28. A number of holes 29 are drilled in the portion of the core forming the recess 28, whereby the bore 27 is brought in communication with the passageway 25. It will readily be comprehended that beer entering the tubular member 10 passes through the bore 27, the holes 29 and into the constricted annular passageway 25 from which the beer flows into the faucet B.

In order to observe the condition of the beer entering the faucet a window or sight glass indicated in its entirety by the reference numeral 42 is utilized which is illustrated in detail in Figs. 1 and 2. This window is constructed as follows: In the extreme end 43 of the tubular member is formed an annular recess 44 in which is inserted a glass tube 45. At the end of said recess is provided a gasket 46 against which this tube abuts. An opening 47 in the portion 43 of tubular member 10 and registering with the glass tube 45 permits observation of the beer passing through said tube. The other end of the tube 45 is seated against a gasket 48 disposed within a coupling 49. Coupling 49 is provided with a threaded portion 52 which screws upon the threads 11 of the member 10 clamping the glass tube 45 firmly in position and forming a fluid tight connection between the tubular member 10 and the glass tube 45. The coupling 49 is constructed with a nipple 53 to which an ordinary tube connection 54 may be attached, which tube connection serves to connect the beer supply tube 55 to the regulating device A.

The faucet B consists of a body 56 having a horizontal portion 57, a forwardly projecting guide 58 and a spout 59. The horizontal portion 57 is constructed with a horizontal bore 62 which receives the protruding part of the forward end 31 of the core 23 and which bore forms a passageway communicating with a number of buttons 32 which are attached to the same and which engage within the bore 62 and slidably support the core relative to the bore 12. These buttons also engage a shoulder 50 formed in said bore.

In order that the head 103 function properly with respect to the core 23, it is necessary that the core be held fixed relative to the faucet body 56. This is accomplished by means of a compression coil spring 108 which is seated at one end against the shoulder 13 and at its other end against another shoulder 109 formed on the flange 26. This spring urges the core forwardly bringing the buttons 32 into engagement with shoulder 50.

The faucet B is held from rotation with respect to the flow regulating device A by means of a pin 63 attached to the tubular member 10, which pin is received within a longitudinally extending slot in the extreme end of the horizontal portion 57 of said faucet body. A threaded cap 65 engages the shoulder 22 of flange 15 and is screwed upon threads 66 formed on the extreme end of the horizontal portion 57 of the faucet body 56. This cap urges the end of the flange 15 against a gasket 67 seated at the end of the horizontal portion 57 of the faucet body.

Within the horizontal portion 57 of the body 56 is provided a valve seat 68 which separates the passageway 62 from another passageway 69 communicating with the passageway 71 extending through spout 59. At the discharge end of the spout 59 is provided a cross 72 which is disposed within the passageway 71 and which serves to prevent breaking of the stream of the beer passing through the faucet upon the discharge of the same from the spout. The guide 58 of the body 56 is formed with a bore 73 which is concentric with the valve seat 68. Bore 73 opens to the exterior at the forward end of the guide 58 and has an enlarged end 74. By means of this construction a shoulder 75 is provided between the two portions of the bore.

Slidably mounted in the bore 73 is a valve stem 76. This valve stem is reduced in diameter at 77 and extends into the passageway 69 and past the valve seat 68. In proximity to the valve seat 68 the valve stem is constructed with a shoulder 78 against which a valve head 79 is urged. At the extreme end of the valve stem 76 is provided a spindle 81 which is reduced in diameter and threaded. Upon this spindle is screwed a nut 82 which urges the valve head 79 against the shoulder 78.

On the upper portion of the guide 58 and intermediate the ends thereof is provided a boss 83 which extends upwardly therefrom. This boss is constructed with a cylindrical hole 84 which extends through the same and communicates with the enlarged end 74 of the bore 73. The valve stem 76 is similarly constructed with a round hole 85 which is smaller in diameter than the hole 84 and which is countersunk as designated at 86. This hole is so disposed that the same is substantially opposite the hole 84 throughout movement of the valve stem.

For operating the valve stem 76 a lever 87 is employed which is constructed with an arm 88 extending through the hole 84 and into the portion 74 of the bore 73. Said lever is further constructed with a threaded shank 92 which serves as the other arm of the lever and which projects outwardly beyond the device. Intermediate the ends of the lever the same is provided with a spherical portion 89 which fits snugly within the hole 84 in boss 83. A pin 91 passes through the spherical portion 89 of said lever and the portion 83 and serves to pivot said lever for swinging movement with reference thereto. At the end of the arm 88 of lever 87 is provided a cylindrical head 93 which fits within the hole 85 in valve stem 76. This spherical head both swings and slides with reference to the hole 85 and operates to reciprocate the valve stem 76 within the bore 73 of guide 58 as the lever is moved to and fro. A handle 94 which is constructed as a ball and which has a threaded hole 95 is screwed upon the shank 92 of the lever 84.

Within the enlarged end 74 of bore 73 is disposed a sleeve 96. This sleeve is constructed with a bore 97 which further serves to assist in guiding the valve stem 76. Encircling said valve stem and disposed within the enlarged end 74 of bore 73 and between the end of the sleeve 96 and shoulder 75 is a packing ring 98 which is adapted to be urged into engagement with the valve stem 76 and to effect a fluid tight connection between said valve stem and the faucet body 56. Sleeve 96 has a large hole 99 in it through which the arm 88 of lever 87 extends. This hole is of such dimensions that the sleeve may be moved throughout its range of adjustment without affecting the operation of said lever. The outer end of sleeve 96 is engaged by means of a screw cap 101 which is screwed upon the threaded end 102 of the guide 58. As the cap 101 is screwed up, sleeve 96 is urged inwardly and against the packing ring 98 which procures a tight joint between the valve stem 76 and the faucet body 56.

The nut 82 which is attached to valve stem 76 is provided with a tubular head 103 of a diameter to snugly fit within the bore 27 of core 23. This head is provided with a centrally drilled passageway 104 which is constructed with two outwardly extending ports 105. These ports are adapted to register with two ports 106 in the outer end of the core 23. When the faucet is first opened, the ports 105 and 106 are out of register and all of the beer traveling through the faucet travels through the constricted passageway 25 and substantially clear beer may be drawn from the dispensing device. When each of the ports 105 and 106 is brought into register with one another, part of the beer travels through the bore 27 and said ports and by-pass and the constricted passageway 25. This portion of the beer becomes greatly agitated in passing through the said ports, which are constructed with sharp corners. This produces foam within the beer which mixes with the clear beer leaving passageway 25. When the corners of the passageway formed by these ports are made sharp, extremely fine bubbles are produced and a creamy foam results.

To adjust the amount of foam formed on the beer, a threaded spindle 107 is formed on the end of the valve stem 76 which projects through the cap 101. A nut 108 screwed upon this spindle is adapted to engage said cap and to limit the inward movement of the head 103. In this manner the size of the opening formed by the ports 105 and 106 can be accurately determined and the amount of foam produced on the beer controlled at will. The position of the parts when nut 108 engages the cap 101 is shown in Fig. 2.

The operation of this form of the invention is obvious. When beer is desired to be drawn from the dispensing device, the handle 94 is moved forwardly and the lever 87 reciprocates the valve stem 76 rearwardly. This disengages the valve head 79 from valve seat 68 and permits clear beer to flow from the constricted passageway 25 and into the passageway 62 past the valve seat 68 through passageway 69 and to be discharged from the spout 59 through passageway 71. The cross 72 prevents the stream from breaking up so that unnecessary agitation is avoided in the beer leaving the dispensing device through the spout. If the handle 94 is only partly moved, clear beer may be drawn. If beer with foam on it is desired, the handle is moved forwardly as far as it will go and until the nut 108 engages the cap 101 and terminates the movement of the valve stem. Beer with a predetermined amount of foam is then procured.

In Figs. 5 and 6 I have shown another form of the invention. Inasmuch as certain of the parts of this form of the invention are identical with those previously described, the description thereof will not be repeated, and reference numerals having the suffix "a" will be used to designate corresponding parts. In this form of the invention the faucet body 56a is arranged on an incline so that the spout 59a forms an acute angle with the portion 57a of the faucet body and the guide 58a. Issuing from the portion 57a is a lateral extension 111 which is constructed with a threaded portion 112 taking the place of the threaded portion 66 and by means of which the faucet is attached to the tubular member 10a as previously described. In this form of the invention the nut 82a forms no part of the foam controlling mechanism and merely serves to hold the valve head 79a attached to the spindle 76a. At the end of the portion 57a is provided a cap 113 which also forms a seat for a spring 114 engaging the valve head 79a and urging the valve into closing position. In this form of the invention the adjusting nut 108 and spindle 107 are dispensed with and cap 101a made solid. In order to more conveniently manipulate the lever 87a, handle 94a has attached to it a member 115 which is adapted to receive the shank 92a of said lever. This shank in this case is constructed without threads and may be pressed or soldered into the member 115 which is constructed with a threaded shank 116 adapted to screw into the threaded hole 95a of handle 94a.

The core 23a is constructed at its forward end with a cylindrical extension 117 concentric with the core proper. This extension is guided for sliding movement in a bore 118 in the portion 111 of the faucet body 56a. A passageway 119 in portion 111 communicates with the bore 118 and is also in communication with the bore 27a of core 10a through a passageway 121 in the extension 117. Formed on the portion 111 of faucet body 56a is a boss 122 best shown in Fig. 6 which is constructed with a threaded opening 123. This portion of the faucet body is further provided with a cylindrical bore 124 concentric with the opening 123. Screwed in the threaded opening 123 is a valve guide 125 which is constructed with a threaded opening 126 concentric with the bore 124 and with a bore 127 also concentric with said bore and opening. A valve stem 128 is screwed in the threaded opening 126 and has a valve head 129 formed with a square end 131, which head is slidable in the bore 124. The valve stem 129 is provided with a handle 131' by means of which the same may be rotated. To prevent leakage of beer past the valve stem 128 a packing 132 is provided which is urged against the said stem by means of a sleeve 133 and a gland 134 screwed upon the end of the guide 125. The square edge 131 of the valve head 129 is adapted to open and close the passageway 119 as shown in Fig. 6, whereby a certain amount of beer may be directed through the bore 27a of the core 23a, the passageway 121, the passageway 119 and into the passageway 62a from which the beer passes into passageway 69a and passageway 71a and is discharged from the dispensing device through the spout 59a. This portion of the beer is highly agitated in passing the square end 131 of the valve head 129 and causes appreciable foam. By adjusting the valve head 129 through the handle 131 any amount of foam can be procured and foam having relatively fine bubbles results.

In both of the forms of the invention shown in Figs. 1 and 5 the flow regulating device A extends through the wall 16 of the beer cabinet. This device may be arranged entirely exteriorly of the beer cabinet in the construction shown in Figs. 7, 8 and 9. In this form of the invention the wall of the beer cabinet is designated by the reference numeral 134 and is constructed with a hole 135 as previously described. A tubular member 136 is here employed which is threaded upon its exterior as designated at 137 and which is provided with a nut 138 screwed upon its threaded end and engaging the inner surface of the wall 134 of the beer cabinet.

The faucet body of the invention as shown in Figs. 7, 8 and 9 is indicated at 138 and comprises a vertical portion 139 and a guide 141 extending upwardly therefrom. This faucet body also includes a spout 142 which projects outwardly from the portion 139 and which is directed downwardly as best shown in Fig. 8. Said faucet body also includes a nipple 143 which projects outwardly from the portion 139 and below the spout 142. In the nipple 143 is formed a bore 144 which communicates with a passageway 145 in said nipple. Passageway 145 communicates with a bore 146 in the portion 139 of faucet body 138 which is constructed reduced in diameter as indicated at 147 to form a shoulder 148 therebetween. At the end of the reduced portion 147 is formed a valve seat 149. The bore 147 communicates with a bore 151 in the spout 142 which is open at its lower end to discharge from the spout. In the lower end of the spout is provided a cross 152 similar to the cross 72 previously referred to which serves the same purpose.

The nipple 143 is internally threaded at 153 to screw upon the threaded end 154 of the tubular member 136. Within the bore 144 is provided a sight glass 155 which is held in position against two gaskets 156 and 157, as previously described. An opening 158 in the nipple 143 permits of viewing the beer passing through the sight glass 155. The nipple 143 is constructed with a shoulder 159 against which a collar 161 rests, which collar in conjunction with nut 138 serves to mount the device on the wall 134 of the beer cabinet.

The faucet of this form of the invention includes a valve stem 162 which is slidably mounted in a guideway 163 in guide 141. This valve stem has attached to it a valve head 164 which is mounted on the lowermost threaded end 165 of said valve stem and is held in position thereon by means of a nut 166. This valve head is adapted to engage the valve seat 149 and to close communication between the passageway 147 and the passageway 151.

Attached to the portion 139 of body 138 is a cylinder 167. This cylinder has a portion 168 snugly fitting within the bore 146 of the portion 139 of body 138 and is constructed with a collar 169 integral therewith. A flanged nut 171 engages this collar and is threaded upon the extreme lowermost end 172 of the portion 139 of body 138. The cylinder 167 is constructed with a bore 173 extending throughout the length of the same and which is closed at its lowermost end by means of a head 174 integral with the cylinder.

Mounted within the bore 173 is a tubular core 175 which is of dimensions slightly less in diameter than the bore of the cylinder 167 to provide a restricted passageway 176 therebetween. This core is itself constructed with a bore 177. One end of the core 175 is provided with a collar 178 which snugly fits within the bore 173 of cylinder 167 and which guides the said core for sliding movement at its lower end. The upper end of the core 175 is similarly constructed with a collar 179 which is of the larger diameter and which is slidably mounted in the bore 146 of the portion 139 of faucet body 138. By means of this construction the core 175 is arranged for concentric sliding movement within the cylinder 167 to maintain the constricted passageway 176 uniform throughout movement of the core. The core 175 is urged upwardly by means of a compression coil spring 181 which is seated at one end against the lower end of the core 175 and at its other end against the head 174.

Attached to the threaded end 165 of valve stem 162 is a solid cylindrical core 182 of lesser dimensions than the bore 177 of core 175 which forms in conjunction with said core another constricted passageway 183. Passageway 176 is brought into communication with passageway 183 at the lower end of the cores by means of holes 184 which are drilled through core 175. Opposite these holes the core 182 is constructed with an annular recess 185 with which the holes 184 communicate. The upper end of the passageway 183 communicates with the passageway 147. It will readily be comprehended that beer passing through the passageway 145 is directed through the constricted passageways 176 and 183 and when the faucet is open passes through the passageway 151 of the spout 142 and out of the device. The core 182 and the valve head 149 are urged upwardly by means of a compression coil spring 186 which is seated at one end against the seat 174 and at its other end against the lowermost portion of the core 182. In the flange 179 of core 175 are formed a number of ports 187 which when the core 175 is in its uppermost position and seated against the shoulder 148 are closed. When the core 175 is moved downwardly, these ports are opened and permit a small amount of beer to pass through the same. These ports are constructed with sharp edges and likewise the shoulder 148 is constructed with a sharp edge so that the beer passing through these ports is greatly agitated and foam is produced. The core 175 is moved downwardly by means of the core 182, the lowermost portion of which engages an inwardly extending flange 188 formed on the core 175. When the faucet is partly open, clear beer is drawn from the device and when the core 182 engages flange 188, core 175 moves with it and uncovers the ports 187, permitting beer with foam to be drawn from the device.

For operating the valve stem 162 the following construction is employed. On the uppermost portion of the guide 41 is provided a tubular extension 189 integral therewith. Within this extension is slidably mounted a cap 191 which has a spherical head 192 formed on the upper portion of the same. A spring 193 seated against the guide 41 and the head 192 of the cap 191 urges the said cap upwardly. The head 192 is adapted to engage the upper end of the valve stem 162 and when pressure is applied to said cap forces the valve stem downwardly to open the valve of the faucet and to manipulate the foam regulating device.

For operating the cap 191 a lever 194 is employed which consists of a threaded shank 195 terminating in a ball cam 196. Ball cam 196 has a flattened cam surface 197 at the lower end of the same which is in direct contact with the spherical head 192. The ball cam 196 is rotatably mounted in a spherical socket 198 formed in a thimble 199. This thimble is slidably mounted upon the exterior of the tubular extension 189 and is constructed at its lowermost end with an outwardly extending flange 201. A cap 202 is screwed upon the threaded end 203 of guide 141 and is adapted to move the thimble 199 downwardly. The thimble is held from rotating movement on the extension 189 by means of a screw 223 which passes through a slot 204 in the tubular extension 189. The shank 195 of lever 194 passes through an arcuate slot 205 in the end of the thimble and guides the lever for movement from its position shown in Fig. 9 to that shown in Fig. 8. Attached to the end of the shank 195 is a handle 206 which serves the same purpose as the handle 94 previously referred to.

The device operates as follows: When the handle 206 is moved to the position shown in Fig. 9 the ball 196 is rotated and the surface 197 engages the spherical head 192 and moves the cap 191 downwardly. As soon as the cap engages the end of the valve stem 162 the valve is opened. When the valve is fully open the core 182 engages flange 188 and moves the core 175 downwardly. This opens the ports 187. In the latter position beer with foam may be drawn from the faucet and prior to the opening of the ports 187 clear beer may be drawn. When the handle 206 is in its lowermost position, as shown in Fig. 9, the faucet and the ports are fully open. By adjusting the cap 202 the position of the thimble 199 may be adjusted and the amount of movement of the core 175 controlled to vary the opening of the ports 187. In this manner any amount of foam may be procured on the beer.

My invention is highly advantageous in that a construction is provided whereby the amount of foam is positively controlled so that any predetermined amount of foam may be had. By the use of sharp edges on the ports through which the beer is by-passed extremely fine bubbles are procured and a rich creamy looking foam results. With my invention either clear beer or beer with foam may be procured and by means of the limiting devices employed maximum foam can be readily had by moving the faucet operating member to its extreme position. My invention is extremely simple in construction and positive in operation and may be readily disassembled for the purpose of cleaning and repair.

Changes in the specific form of my invention, as herein disclosed, may be made within the scope of what is claimed without departing from the spirit of my invention.

Having described my invention, what I claim as new and desire to protect by Letters Patent is:

1. In a beer dispensing device, a body having a bore therein, a core within said bore forming in conjunction therewith an inlet chamber, an outlet chamber and an annular restricted passageway communicating with said inlet chamber and said outlet chamber, said passageway reducing the pressure of the beer without appreciable agitation, means forming a by-pass between said inlet and outlet chambers, means for guiding said core for axial movement within the bore, and means operable through movement of said core for varying the amount of beer passing through said by-pass.

2. In a beer dispensing device, a body having a bore therein, a core within said bore forming in conjunction therewith an inlet chamber, an outlet chamber and an annular restricted passageway communicating with said inlet chamber and said outlet chamber, said passageway reducing the pressure of the beer without appreciable agitation, means forming a by-pass between said inlet and outlet chambers, a faucet connected to said outlet chamber and having a movable valve member, and means operated by said movable valve member for varying the amount of beer passing through said by-pass.

3. In a beer dispensing device, a body having a bore therein, a core slidable axially within said bore and forming in conjunction therewith an inlet chamber, an outlet chamber and an annular restricted passageway communicating with said inlet chamber and said outlet chamber, said passageway reducing the pressure of the beer without appreciable agitation, means forming a by-pass between said inlet and outlet chambers, a faucet connected to said outlet chamber and having a movable valve member, said core being moved by said valve member, and valve means in said by-pass operable through movement of the core for varying the amount of beer passing through said by-pass.

4. In a beer dispensing device, means forming an inlet chamber and an outlet chamber, a pressure reducing device between said inlet chamber and said outlet chamber, said pressure reducing device being constructed to reduce the pressure of the beer entering said outlet chamber without appreciable agitation, a faucet connected to said outlet chamber and having a movable valve member, and means operated by said movable member for agitating and by-passing varying amounts of beer past said pressure reducing device.

5. In a beer dispensing device, a body having a bore therein, a core within said bore forming in conjunction therewith an inlet chamber, an outlet chamber and an annular restricted passageway communicating with said inlet chamber and said outlet chamber, said passageway reducing the pressure of the beer without appreciable agitation, said core having a bore therein communicating with said inlet chamber, and ports leading from said core to said outlet chamber for by-passing beer past said annular passageway, said ports causing agitation of the beer passing therethrough.

6. In a beer dispensing device, a body having a bore therein, a core within said bore forming in conjunction therewith an inlet chamber, an outlet chamber and an annular restricted passageway communicating with said inlet chamber and said outlet chamber, said passageway reducing the pressure of the beer without appreciable agitation, said core having a bore therein communicating with said inlet chamber, ports leading from said core to said outlet chamber for by-passing beer past said annular passageway, said ports causing agitation of the beer passing therethrough, and means for varying the opening through said ports.

7. In a beer dispensing device, a body having a bore therein, a core within said bore forming in conjunction therewith an inlet chamber, an outlet chamber and an annular restricted passageway communicating with said inlet chamber and said outlet chamber, said passageway reducing the pressure of the beer without appreciable agitation, said core having a bore therein communicating with said inlet chamber, ports leading from the bore of said core to said outlet chamber for by-passing beer past said annular passageway, said ports causing agitation of the beer passing therethrough, and a plunger slidable relative to said ports for varying the opening through said ports.

8. In a beer dispensing device, a body having a bore therein, a core within said bore forming in conjunction therewith an inlet chamber, an outlet chamber and an annular restricted passageway communicating with said inlet chamber and said outlet chamber, said passageway reducing the pressure of the beer without appreciable agitation, said core having a bore therein communicating with said inlet chamber, ports leading from said core to said outlet chamber for by-passing beer past said annular passageway, said ports causing agitation of the beer passing therethrough, a faucet connected to said outlet chamber and having a movable valve member, and a plunger slidable relative to said ports for varying the opening through said ports.

9. In a beer dispensing device, a body having a bore therein, a core within said bore forming in conjunction therewith an inlet chamber, an outlet chamber and an annular restricted passageway communicating with said inlet chamber and said outlet chamber, said passageway reducing the pressure of the beer without appreciable agitation, said core having a bore therein communicating at one end with said inlet chamber, said body having a passageway communicating with the bore of said core, bore and outlet chamber, and a throttle valve in said last named passageway.

10. In a beer dispensing device, a body having a bore therein, a core within said bore forming in conjunction therewith an inlet chamber, an outlet chamber and an annular restricted passageway communicating with said inlet chamber and said outlet chamber, said passageway reducing the pressure of the beer without appreciable agitation, a flange on said core separating said inlet and outlet chambers, said flange having ports therein adapted to by-pass beer from said inlet chamber to said outlet chamber and causing agitation of the beer passing therethrough.

11. In a beer dispensing device, a body having a bore therein, a core within said bore forming in conjunction therewith an inlet chamber, an outlet chamber and an annular restricted passageway communicating with said inlet chamber and said outlet chamber, said passageway reducing the pressure of the beer without appreciable agitation, a flange on said core separating said inlet and outlet chambers, said flange having ports therein adapted to by-pass beer from said inlet to said outlet chamber and causing agitation of the beer passing therethrough, means for guiding said core for axial movement within said bore, and a shoulder on said body adapted to engage said flange to close the ports when the core is in one position to obstruct the flow of beer therethrough.

12. In a beer dispensing device, a body having a bore therein, a core within said bore forming in conjunction therewith an annular restricted passageway, said body having an inlet chamber communicating with one end of said annular passageway, said core having a bore therein, a second core within the bore in said first core and forming in conjunction therewith a second annular constricted passageway, said second annular passageway being in communication with the first annular passageway at the end thereof opposite to the end connected with the inlet chamber and an outlet chamber connected with the other end of said second named annular passageway.

13. In a beer dispensing device, a body having a bore therein, a core within said bore forming in conjunction therewith an inlet chamber, an outlet chamber and an annular restricted passageway communicating with said inlet chamber and said outlet chamber, said passageway reducing the pressure of the beer without appreciable agitation, said core having a bore therein communicating with said inlet chamber, a port leading from the bore of said core to said outlet chamber for by-passing beer past said annular passageway, said port causing agitation of the beer passing therethrough and valve means having relative axial sliding movement with relation to said core for covering and uncovering said port.

14. In a beer dispensing device, a body having a bore therein, a core within said bore forming in conjunction therewith an inlet chamber, an outlet chamber and an annular restricted passageway communicating with said inlet chamber and said outlet chamber, said passageway reducing the pressure of the beer without appreciable agitation, said core having a bore therein communicating with said inlet chamber, a port leading from the bore of said core to said outlet chamber for bypassing beer past said annular passageway, said port causing agitation of the beer passing therethrough and valve means having relative movement with relation to said core for covering and uncovering said port.

15. In a beer dispensing device, a body having a bore therein, a core within said bore forming in conjunction therewith an inlet chamber, an outlet chamber and an annular restricted passageway communicating with said inlet chamber and said outlet chamber, said passageway reducing the pressure of the beer without appreciable agitation, said core having a bore therein communicating with said inlet chamber and further having a part formed with a port communicating with the bore in said core and said outlet chamber, said port causing agitation of the beer passing therethrough and a valve member having a port disposed at the denoted part of said core, one of said ports being movable relative to the other to cover and uncover said port in the core.

16. In a dispensing device, means forming an inlet chamber and an outlet chamber, a pressure reducing device between said inlet chamber and said outlet chamber, said pressure reducing device being constructed to reduce the pressure of the beer entering said outlet chamber without appreciable agitation, a faucet connected to said outlet chamber and having a movable valve member and valve means operated by said movable member for agitating and by-passing beer past said pressure reducing device.

17. In a dispensing device, means forming an inlet chamber and an outlet chamber, a pressure reducing device between said inlet chamber and said outlet chamber, said pressure reducing device being constructed to reduce the pressure of the beer entering said outlet chamber without appreciable agitation, a faucet connected to said outlet chamber and having a movable valve member, a by-pass passageway by-passing a part of the beer past said pressure reducing device, and a valve having a passageway communicating with said by-pass passageway, one of said passageways being constructed to agitate the beer flowing therethrough, said valve having a movable member operated by said faucet.

18. In a beer dispensing device, a body having a bore therein, a core within said bore forming in conjunction therewith an inlet chamber, an outlet chamber and an annular restricted passageway communicating with said inlet chamber and said outlet chamber, said passageway reducing the pressure of the beer without appreciable agitation, said core having a bore therein communicating with said inlet chamber, a port in said core communicating with the bore thereof, the portion of said core adjacent said port having a sharp corner over which the beer travels to agitate the same, and a valve member having relative sliding movement with respect to said core and having a port adapted to register with said port in the core, the portion of said valve member adjacent said last named port being constructed with a sharp corner over which the beer travels to further agitate the beer.

RICHARD T. CORNELIUS.